Figure 1:
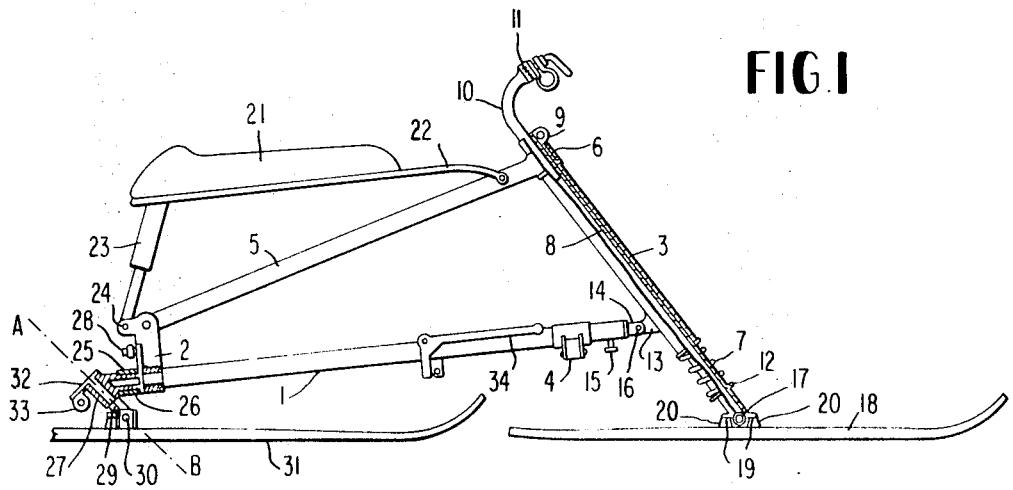

United States Patent

[11] 3,588,138

| [72] | Inventor | Anton Cerny, Jr.<br>10 Siedlergasse 1233, Vienna, Austria |
|---|---|---|
| [21] | Appl. No. | 795,219 |
| [22] | Filed | Jan. 30, 1969 |
| [45] | Patented | June 28, 1971 |
| [32] | Priority | Jan. 31, 1968 |
| [33] | | Austria |
| [31] | | A976/68 |

[54] COLLAPSIBLE SKI-BOB
6 Claims, 5 Drawing Figs.

| [52] | U.S. Cl. | 280/16 |
|---|---|---|
| [51] | Int. Cl. | B62b 13/04 |
| [50] | Field of Search | 280/16, 20, 287, 21 |

[56] References Cited
UNITED STATES PATENTS

| 2,905,479 | 9/1959 | Schomers | 280/16 |
|---|---|---|---|
| 3,140,099 | 7/1964 | Feu | 280/16 |
| 3,326,569 | 6/1967 | Leeming | 280/16 |
| 3,398,970 | 8/1968 | Horiuchi | 280/16 |
| 3,438,643 | 4/1969 | Spiehs | 280/20 |

FOREIGN PATENTS

| 217,307 | 9/1961 | Austria | 280/21.2 |
|---|---|---|---|

*Primary Examiner*—Leo Friaglia
*Assistant Examiner*—Robert R. Song
*Attorney*—Craig, Antonelli, Stewart and Hill ABSTRACT: A ski-bob employs a steerable front ski and two rear skis, each ski being suspended to provide both rocking and tilting motion thereof. The rear skis are connected by a parallelogram link-type structure which is fastened to the front steering mechanism by two inclined members, on the upper of which the seat is attached. Through a clamp member and a pivot attachment connected to the steering column, rotation thereof enables the ski-bob to be collapsible whereby it may be easily transported.

INVENTOR
ANTON CERNY, JR.

COLLAPSIBLE SKI-BOB

The invention constitutes a ski-bob, possessing a steerable front ski and two rear skis. The suspension of all three skis to be both tiltable and swingable provides for both rocking and edging. Furthermore, it is possible to bring the rear skis into a snowplow position, in which case the steering ability is maintained by the steerable front ski. On rough terrain, this vehicle offers the same advantages as a single-track ski-bob. It can be dismantled for transportation, hung onto slope tows or onto the ski carriers when using chair lifts.

In conventional equipment of this type, the edging or tilting of the skis requires the driver to lean over to the side in order to pivot the steering unit. Such designs give the ski-bobber a feeling of uncertainty, since the steering mechanism is laterally unstable. Vehicles that can be made to simulate the snowplow position of a skier are familiar. In such cases the skis are coupled to the steering wheel by a complicated system of levers, and by drawing back the steering wheel the driver can adjust the skis to a snowplow position. Here again, the instability of the steering column is a disadvantage. Moreover, as long as the vehicle maintains the snowplow position, it cannot be steered at all, since the necessary front ski is lacking. This invention consists of an inclined central axis, to which the frame carrying the seat and the steering column is hinged at two points. This axis is rigidly fastened to a bridge in which the rear skis are so suspended that they are free to turn. At the rear end of the frame a pin is provided, which engages with a type of knuckle tie rod mechanism and transmits every oscillatory movement of the frame about the axis 1 to the rear skis. To maintain stability of equilibrium, foot supports are provided on the fixed axis, which remain constantly parallel to the ground, thus enabling the rider to return to vertical after rounding a curve. These are, therefore, to serve as reference points.

Considering the short length of the skis, it is a frequent occurrence that these dig into deep snow and tip over. In the usual types of such equipment, the means employed to secure stability possess only a small degree of elasticity. Even in this connection, further improvements are made in this invention, and the use of rubber buffers has to a great extent eliminated such undesirable occurrences as clatter on hard runs or even ski breakage. As a result of better location of the hinged joints and the provision of easily disconnectable fastenings the ski-bob can be folded to an astonishingly small size.

The drawing shows one of the models.

Figure 2:
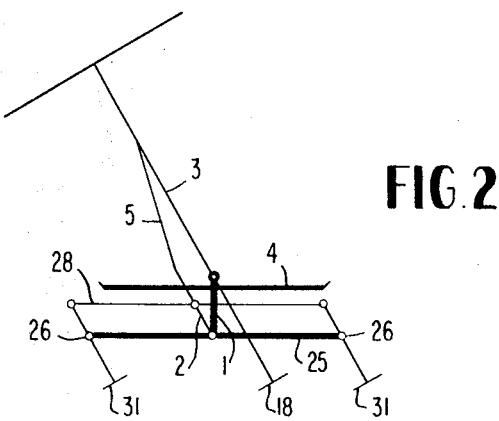
Figure 4:
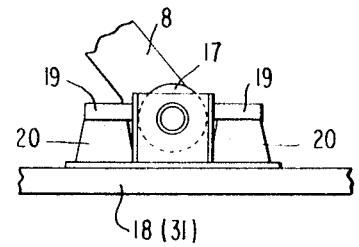
Figure 3:
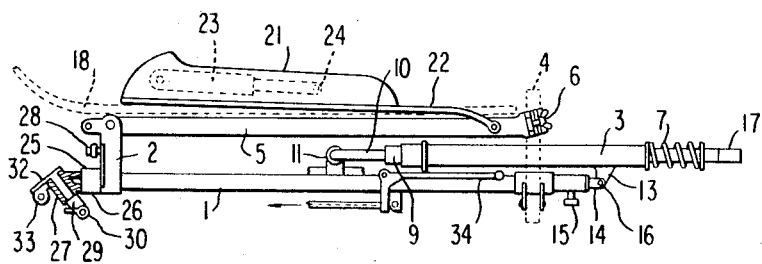
Figure 5:
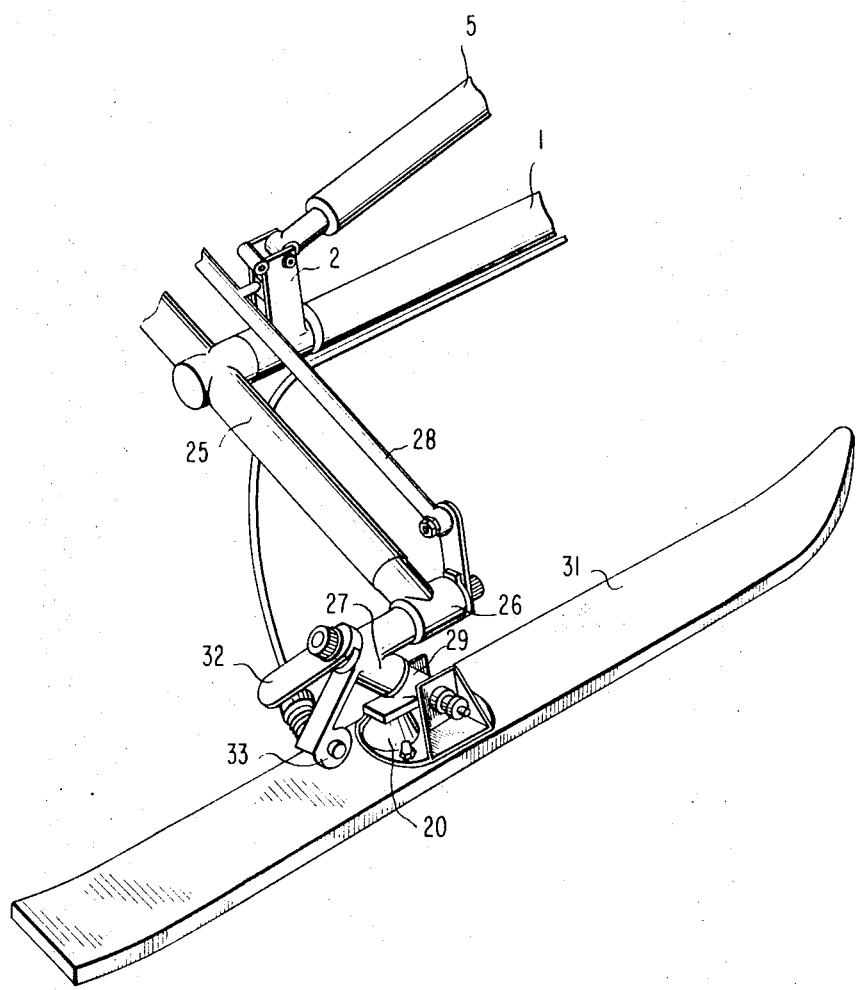

FIG. 1 shows a side view of the ski-bob.
FIG. 2 explains how the edging mechanism functions.
FIG. 3 shows the ski-bob in its collapsed form.
FIG. 4 shows the stabilizer unit in detail.
FIG. 5 is an isometric view of a rear portion of a ski-bob.

The axis 1 is placed at a slant, firstly in order to maintain the front hinge 16 at a higher point than the rear hinge, so that when rounding a curve, the front ski moves along the outermost periphery of the curve in the usual way, and secondly, in order that the rear skis 31 take up positions with respect to the frame in which their points are directed towards the outermost periphery, thus providing an additional steering effect, making it easier to wedel or to swing around to a stop. The member 2, to which the frame is connected, is carried on a bearing provided on the axis 1, so that the frame can swing freely about the axis. For the purpose of dismantling, the member 5 is pin-jointed to the member 2. The member 5 is equipped with a clamp at its end, with the help of which it is fastened to the member 3 using a hammer bolt and a wing nut. The sharply inclined member 3 is of tubular construction through which the steering column 8 passes, and is provided at its lower end with a spring collar which presses against one end of a compression spring 7, the other end of which rests against a collar 12 mounted on the steering column 8. The bracket plate 13 is welded to the member 3 and is hinged to the member 14 using the bolt 16. The member 14 can turn freely within the axis 1 and is provided with a groove cut in its circumference, into which the screw 15 projects, so that, although the member 14 is permitted to turn freely, it cannot come off. The steering column is provided with a radial bearing 17 in order to permit a rocking motion of the front ski 18. The two collar plates 19 have been rigidly secured to the bearing 17, so that when the front ski 18 rocks, the rubber buffers 20 are alternately loaded and unloaded. This arrangement offers excellent stabilization. The upper end of the steering column 8 has a short axial groove cut in it. With the help of this and the tightening clamp 9, the handle bar assembly is secured to the steering column. The handlebar assembly 10 is equipped with a serrated clamping device 11, which when loosened permits the handlebar to be turned in a plane parallel to the steering column, for the purpose of dismantling. The axis is also provided with hinged foot rests 4 which serve a double purpose: firstly, as normal foot supports and secondly, as balance stabilizers, since the ski-bobber keeps the frame in equilibrium by using his feet. The seat 21 is mounted on a bridge 22, the front part of which is pin-jointed to the frame member 5. A recess is provided within the seat 21, and at the rear end of this a transverse bolt is located to carry the shock absorber 23. At the lower end of the shock absorber 23 there is a cross-hole 24 in order to connect it to the member 2 using a familiar type of safety bolt, which can be easily removed. On removing the safety bolt, the shock absorber 23 can be folded into the recess provided within the seat 21, as can be seen in FIG. 3. At the rear end of the axis 1 a bridge 25 is rigidly secured and, as a result of which, this bridge remains constantly parallel to the foot supports (see FIG. 2, parts 25 and 4). The bridge 25 is equipped with bearings 26 at both ends, the bores of which run parallel to the axis 1. Consequently, these bearings are also inclined, and it is this arrangement that provides the feature of rear ski control when edging during a turn. At each of these bearings 26 an additional bearing 27 is provided, which is capable of turning freely and has its bore along the axis A—B. With the help of a normal type of a tie rod mechanism, these bearings 27 and the frame are maintained constantly parallel to one another during their displacement. As is advantageously seen in FIG. 5, each of these bearings 27 is fitted with a short steering column 29, carrying a bearing 30 at its lower end to which the rear skis are pin-jointed, thus permitting them to execute a rocking motion. To the upper end of the short steering column 29 a lever 32 is rigidly secured, which carries a plate to bear against a compression spring supported at its other end by a second collar 33, which serves as a fixed point for the Bowden cable. In the scissor position of the two levers 32, the sheathing of the Bowden cable thrusts against the movable lever as soon as a force is exerted on the controls (e.g. pedals). As a result, the short steering columns 29 are turned in towards one another, which causes the rear skis to take up a snowplow position. Since the short steering columns are arranged at a steep angle, the rear skis are edged at the same time.

When folding, the lever screw on the clamp 11 has to be loosened, thus allowing the handlebar to be turned parallel to the steering column. After removing the skis, which are attached to the steering columns by means of safety bolts, the wing nut on the clamp 6 should be loosened, the hammer bolt removed, and the clamp opened. After this, the member 3 and the member 5 may be folded into a position parallel to the axis 1, as shown in FIG. 3.

The joint 24 is then disconnected and the shock absorber folded into the seat 21. The front ski 18 is then pushed backward to lie below the seat and within the seat frame (see FIG. 3). The rear skis are placed on either side between the raised foot supports (not drawn for the sake of clarity). The dismantled ski-bob may then be belted together using rubber cords.

I claim:
1. A ski-bob comprising:
   first, second and third stabilized skis;
   a first inclined member having a forward portion and a rear portion to the forward portion of which a first of said skis is steerably connected;

A parallelogram-link assembly traversely secured to the rear portion of said first inclined member and pivotally attached to said second and third skis;

a frame member pivotally attached at one end thereof to said parallogram-link assembly about a transverse axis and inclined with respect to said first inclined member; and a steering column secured to the other end of said frame member and pivotally attached to said first inclined member about an axis parallel to said transverse axis for providing the connection between said first of said skis and said first inclined member;

whereby upon the tilting of said frame member said parallelogram-link assembly simultaneously tilts said second and third skis.

2. A ski-bob according to claim 1, wherein said frame member is attached to said parallelogram-link assembly by a pin, and to said steering column by a clamp fastened to a jacket provided on said steering column.

3. A ski-bob according to claim 2, wherein said steering column is attached to said first inclined member by means of a bracket affixed to said steering column and pivotally attached to said first inclined member by means of a bearing member provided at the forward portion of said first inclined member, so that upon loosening of said clamp and turning said steering column, said steering column and said frame member can collapse to lie parallel with said first inclined member.

4. A ski-bob in accordance with claim 1, further including a seat pivotally attached to said frame member at its forward portion and connected to said parallelogram-link assembly at its rear portion by means of a shock absorber.

5. A ski-bob according to claim 1, further including means attached to said second and third skis for effecting tilting of said skis into a snowplow position.

6. A ski-bob according to claim 5, wherein said tilting means includes a lever rotatably attached to a short steering column mounted on each of said second and third skis by means of elastic support members, and wherein said lever rotates on said short steering column with respect to a collar fixedly attached to said short steering column.